UNITED STATES PATENT OFFICE.

RUDOLF BERENDES, OF ELBERFELD, GERMANY, ASSIGNOR TO FARBENFA-BRIKEN OF ELBERFELD CO., OF NEW YORK, N. Y., A CORPORATION OF NEW YORK.

PROCESS OF MAKING METHYLENE CITRIC ACID.

SPECIFICATION forming part of Letters Patent No. 722,275, dated March 10, 1903.

Application filed November 22, 1902. Serial No. 132,425. (No specimens.)

*To all whom it may concern:*

Be it known that I, RUDOLF BERENDES, doctor of philosophy, chemist, residing at Elberfeld, Germany, (assignor to the FARBENFABRIKEN OF ELBERFELD COMPANY, of New York,) have invented a new and useful Improvement in Processes of Making Methylene Citric Acid; and I do hereby declare the following to be an exact and clear description of my invention.

I have discovered a new and valuable process for the production of methylene citric acid, which is described in the United States Letters Patent No. 699,422, dated May 6, 1902. My process consists in heating citric acid with chloromethylic alcohol having the formula $Cl-CH_2-OH$. The reaction proceeds with great ease, a good yield of methylene citric acid being the result.

I prepare the chloromethylic alcohol of the above-given formula in the usual manner by saturating a cold concentrated solution of formic aldehyde with hydrogen chlorid. During the process the chloromethylic alcohol thus produced separates in the shape of a colorless oil having a pungent odor.

The following example will serve to illustrate the manner in which my invention can be carried into practical effect, (the parts being by weight:)

Example: Two parts of pulverized citric acid are mixed with two parts of dry chloromethylic alcohol, and the resulting mixture is heated in an autoclave for about four hours to from 130° to 140° centigrade. The cold reaction mass is then dissolved in six parts of boiling water. On cooling the methylene citric acid separates from this solution in the shape of colorless crystals. It is filtered off and dried.

Having now described my invention and in what manner the same is to be performed, what I claim as new, and desire to secure by Letters Patent, is—

The process for the production of methylene citric acid, which process consists in heating citric acid with chloromethylic alcohol and then isolating the resulting methylene citric acid from the reaction mixture, substantially as hereinbefore described.

In testimony whereof I have signed my name in the presence of two subscribing witnesses.

RUDOLF BERENDES.

Witnesses:
   OTTO KÖNIG,
   EMIL BLOMBERG.